United States Patent [19]

Kashima et al.

[11] Patent Number: 5,521,797
[45] Date of Patent: May 28, 1996

[54] BACKLIGHTING DEVICE

[75] Inventors: Keiji Kashima; Yukio Inagaki; Naoki Yoshida, all of Kanagawa, Japan

[73] Assignee: Tosoh Corporation, Yamaguchi, Japan

[21] Appl. No.: 189,753

[22] Filed: Feb. 1, 1994

[30] Foreign Application Priority Data

Feb. 1, 1993 [JP] Japan .................................. 5-014886
Apr. 27, 1993 [JP] Japan .................................. 5-101093

[51] Int. Cl.$^6$ ...................................................... F21V 8/00
[52] U.S. Cl. ............................... 362/31; 362/26; 362/330; 385/129; 385/901
[58] Field of Search .................................. 362/26, 27, 31, 362/330, 333; 359/48, 49, 50; 385/129, 130, 131, 901

[56] References Cited

U.S. PATENT DOCUMENTS

| 4,673,254 | 6/1987 | Kato et al. ........................... 359/599 |
| 4,924,356 | 5/1990 | French et al. ........................... 362/31 |
| 5,134,549 | 7/1992 | Yokoyama ........................... 362/31 |

FOREIGN PATENT DOCUMENTS

| 0500960 | 9/1992 | European Pat. Off. . |
| 0504910 | 2/1993 | European Pat. Off. . |
| 556606 | 8/1993 | European Pat. Off. ........................... 362/31 |
| 0588504 | 3/1994 | European Pat. Off. . |
| 2-257188 | 9/1990 | Japan . |
| W092/04648 | 3/1992 | WIPO ........................... 359/48 |

OTHER PUBLICATIONS

IBM Technical Disclosure Bulletin, "Backlighting for Liquid Crystal Display", Apr. 1987, pp. 4838–4839, class/subcl. 359/49.

Patent Abstracts of Japan, vol. 15, No. 262 (P-1222), Mar. 7, 1991 (JP-A-03 085 586, Oct. 4, 1991).

Patent Abstracts of Japan, vol. 13, No. 324 (P-903), Jul. 21, 1989 (JP-A-01092701, Apr. 12, 1989).

Patent Abstracts of Japan, vol. 15, No. 119 (P-1183), Mar. 22, 1991 (JP-A-3009306, Jan. 17, 1991).

*Primary Examiner*—Ira S. Lazarus
*Assistant Examiner*—Alan B. Cariaso
*Attorney, Agent, or Firm*—Sughrue, Mion, Zinn, Macpeak & Seas

[57] ABSTRACT

A backlighting device for use with display panels has a plurality of light diffusing elements formed in dots or stripes on one of the two major faces of a light conducting plate that is made of a light-transmissive material. The device also has a linear light source provided in proximity to the end portion of at least one side of the light conducting plate. In the device, at least one sheet that is made of a light-transmissive material and which has a multiple of prisms or raised structures having straight ridgelines defined by the apices and minima of the raised structures at small intervals on the same side of the sheet. The sheet is arranged in such a manner that the ridgelines are substantially parallel to one another and is located on an exit face of the light conducting plate in such a way that the straight ridgelines intersect that sides of the major face of the light conducting plate or intersect imaginary lines or stripes that would be drawn when the light diffusing elements are formed on the light conducting plate.

11 Claims, 7 Drawing Sheets

BACKLIGHTING DEVICE

BACKGROUND OF THE INVENTION

The present invention relates to a backlighting device for use with display panels that illuminates transmissive or semi-transmissive panels from the rear side.

Liquid-crystal displays provided with a backlighting mechanism that is thin and which allows for easy viewing of information on the screen are used with recent models of laptop or book type word processors or computers. The backlighting mechanism in common use adopts an "edge lighting" method in which a linear light source such as a fluorescent tube is provided in proximity to one end portion of a transmissive light conducting plate as shown in FIG. 1. A most common type of devices that operate on this edge lighting method is shown in FIG. 2; a plurality of light diffusing elements are formed in dots or stripes on one face of a light conducting plate, which is almost entirely covered with a specular reflecting plate or a light diffusing and reflecting plate whereas the opposite face of the light conducting plate (from which light exits) is covered with a light diffusing sheet.

In addition, as is often the case today, backlighting devices are driven with a battery and a further improvement in the efficiency of conversion from power consumption to luminance is desired. To meet this need, it has been proposed that a sheet made of a light-transmissive material that has a multiple of prisms or raised structures having ridgelines at small intervals on the same side in such a manner that said ridgelines are substantially parallel to one another should be provided on the light emitting surface of the backlighting device, whereby the light it emits is provided with sufficient directivity to increase the brightness in a direction normal to the exit face.

However, the sheet itself is poor in lighting diffusing performance, so it does not have sufficient ability to hide the light diffusing elements formed on the light conducting plate and this has caused a problem in that the shape of the light diffusing elements is seen through the sheet. If the shape of the light diffusing elements is seen through the sheet, uniform areal light emission cannot be achieved.

With a view to solving this problem, it has been proposed that the sheet be provided with light diffusing quality by various methods such as coating the transmissive sheet itself with a light diffusing substance or forming a randomly rough surface on the sheet. However, these approaches have caused another problem in that the sheet's ability to impart directivity to light deteriorates to lower the brightness of the exit face.

It has also been proposed that and a separate light diffusing sheet be used in superposition; however, this arrangement increases the thickness of the backlighting device by the amount that corresponds to the thickness of the light diffusing sheet, thereby making it impossible to satisfy the requirement for fabricating a thinner backlighting device. Further, the approach under consideration is not necessarily satisfactory from the viewpoint of the brightness of the exit face.

If the distance between adjacent light diffusing elements to be formed on the light conducting plate were reduced to a very small value, say, 50 μm or less, the individual light diffusing elements would become practically indiscernible but, as a matter of fact, it is technically difficult to form the light diffusing elements at such small spacings.

FIG. 3 illustrates a method for partially covering the light conducting plate with a light scattering and transmissive substance and/or a light diffusing and reflective substance in such a way as to provide a uniform luminance distribution throughout the light emitting surface of the backlighting device; the partial covering may be in dots as shown in FIG. 3 or in stripes as shown in FIG. 10 in such a way that the coverage per unit area of the light conducting plate increases progressively with the increasing distance from the light source.

The demand for reducing the thickness of laptop or booktype word processors and personal computers is ever growing today and one of the topics under current review by manufacturers is to adopt even thinner light conducting plates in the backlighting mechanism. However, if one wants to have a uniform luminance distribution throughout the light emissive surface of a very thin light conducting plate (particularly 2 mm or less), the coverage with a light scattering and transmissive substance and/or a light diffusing and reflective substance per unit area of the portion of the light conducting plate which is near the light source must be reduced (otherwise, the brightness of the portion close to the light source will become much higher the in the other portions, thus leading to a failure in providing a uniform luminance distribution throughout the emissive surface).

Consider, for example, the case where $TiO_2$ as a light scattering and transmissive substance and/or a light diffusing and reflective substance is applied in a dot pattern on the surface of a Poly methyl methacrylate (PMMA) light conducting plate (250 mm×150 mm), with the individual dots being formed on the points of intersection of imaginary lines on the light conducting plate that are spaced on a pitch of 1 mm. If the thickness of the light conducting plate is 3 mm, a dot diameter of 420 μm (14% coverage) for the portion of the light conducting plate which is close to the light source is sufficient to provide a uniform luminance distribution throughout the emissive surface but if the thickness of the light conducting plate is halved to 1.5 mm, no uniform luminance distribution is insured throughout the emissive surface unless the dot diameter is reduced to 220 μm (3.8% coverage).

If the dot diameter is reduced, the dot-to-dot spacing is increased (in the case of stripes, the distance between adjacent stripes is increased) and the conventionally used light diffusing sheet is unable to diffuse the incoming light by a sufficient degree to prevent the shape of the individual dots from being seen through the sheet.

If, with a view to solving this problem, one uses a plurality of light diffusing sheets (in the case just described above, a single polycarbonate light diffusing sheet 0.2 mm thick suffices if the thickness of the light conducting plate is 3 mm but if the thickness of the light conducting plate is reduced to 1.5 mm, the shape of the individual dots is visible unless three such sheets are used in superposition), the thickness of the backlighting device will increase accordingly but this is not preferred for the purpose of fabricating thinner backlighting devices. In addition, the number of device components will increase to result in a higher cost.

Another problem associated with the decreasing dot diameter is that it becomes technically difficult to form dots on the surface of the light conducting plate (the same problem arises with stripes). The light scattering and transmissive areas and/or the light diffusing and reflective areas are conventionally formed on the surface of the light conducting plate by printing techniques such as screen printing but the printing technology has an inherent limitation in that the printing yield drops if the dot diameter decreases to levels near 200 μm. If the printing yield decreases, the cost of the light conducting plate produced becomes high.

SUMMARY OF THE INVENTION

The principal object of the present invention is to provide a backlighting device that is capable of efficient conversion from power consumption to luminance, that is thin and which yet can be manufactured at low cost.

The present inventors conducted various studies in order to attain the above-stated object and found that when a sheet capable of enhancing the directivity of light from the exit face of a light conducting plate was provided on its surface in such a way as to satisfy specified conditions or when a light scattering and transmissive substance and/or a light diffusing and reflective substance were applied in such a way as to satisfy a specified condition, the light diffusing elements formed on the surface of the light conducting plate were effectively hidden so that they would not be seen through the sheet and, furthermore, the directivity of emerging light was sufficiently enhanced to achieve a substantial increase in the efficiency of conversion from power consumption to luminance in directions close to a line dropped normal to the exit face. The backlighting device thus processed is thin and produces a uniform luminance distribution throughout the light emissive face.

Stated briefly, the present invention relates to a backlighting device for use with display panels that has a plurality of light diffusing elements formed in dots or stripes on one of the two major faces of a light conducting plate that is made of a light-transmissive material, said device having a linear light source provided in proximity to the end portion of at least one side of said light conducting plate, characterized in that at least one sheet that is made of a light-transmissive material and which has a multiple of prisms or raised structures having straight ridgelines at small intervals on the same side in such a manner that said ridgelines are substantially parallel to one another is provided on an exit face of the light conducting plate in such a way that said straight ridgelines intersect imaginary lines that would be drawn when the light diffusing elements are formed on said light conducting plate.

DETAILED DESCRIPTION OF THE PREFERRED EMBODIMENTS

The present invention is described below in great detail with reference to accompanying drawings.

Figure 1:
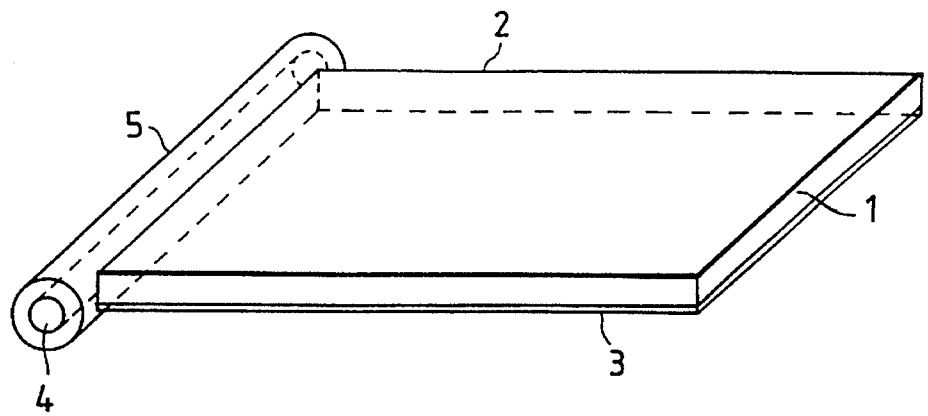
FIG. 1 is a perspective view of a backlighting device operating on the "edge lighting" method.
Figure 2:
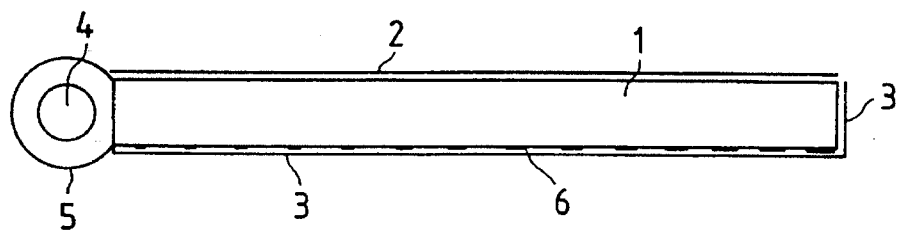
FIG. 2 is a longitudinal section of the backlighting device shown in FIG. 1.

FIG. 1 is a perspective view of a backlighting device according to an embodiment of the present invention, and FIG. 2 is a longitudinal section of a backlighting device that adopts the "edge lighting" method. Shown by 1 in FIGS. 1 and 2 is a light conducting plate that may be made of any material that is capable of efficient light transmission, as exemplified by quarts, glass, or light-transmissive natural or synthetic resins such as acrylic resins. Indicated by 6 in FIG. 2 are light scattering and transmissive areas and/or light diffusing and reflective areas that permit the rays of light incident on the light conducting plate from the end portion of its side to exit from one of the two major surfaces of the plate. The areas 6 can be formed on the surface of the light conducting plate by various methods; for example, media such as paints or printing inks that have a light scattering and transmissive substance and/or a light diffusing and reflective substance (e.g., silica, barium sulfate, magnesium oxide, aluminum oxide, calcium carbonate, titanium white, glass beads or resin beads) dispersed in a light-transmissive substance (e.g., an acrylate ester resin or a vinyl resin) are screen-printed or otherwise printed in dots, stripes or in other patterns on the surface of the light conducting plate; alternatively, the surface of the light conducting plate may be roughened in a dot or stripe pattern, or it may be provided with small holes or projections, or it may be cut to produce a profile having steps formed therein.

Figure 3:
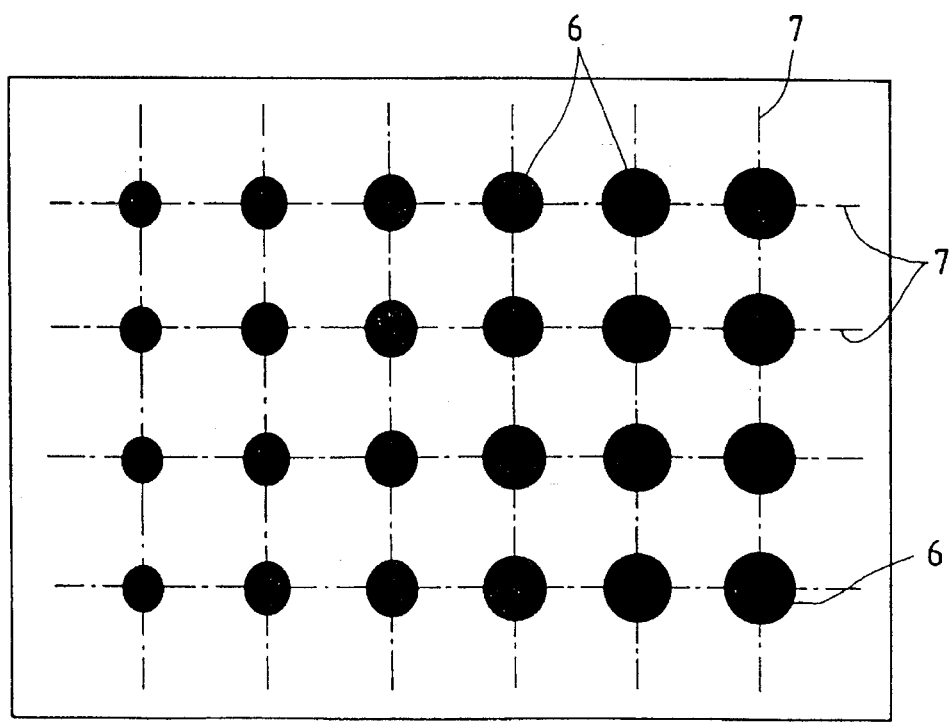
FIG. 3 is a diagram showing the circle-dot-type pattern of light scattering and transmissive areas and/or light diffusing and reflective areas on a light conducting plate, as well as an example of the imaginary lines as formed by connecting those areas.
Figure 10:
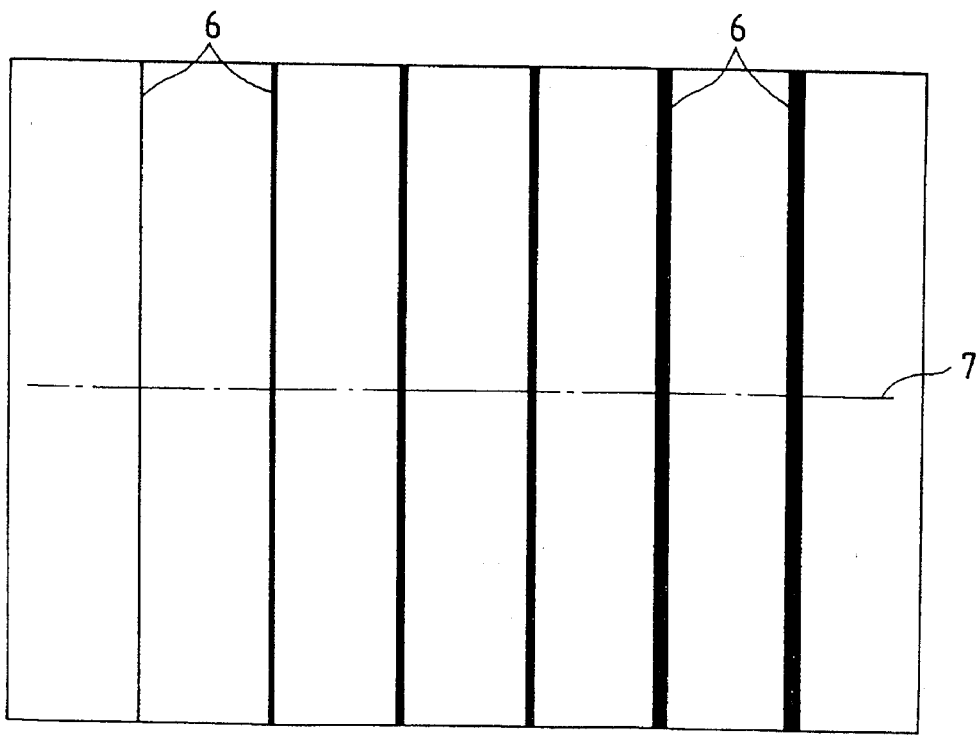
FIG. 10 is a diagram showing a stripe-type pattern of light scattering and transmissive areas and/or light diffusing and reflective areas on a light conducting plate, as well as an example of the imaginary lines as formed by connecting those areas.
Figure 11:
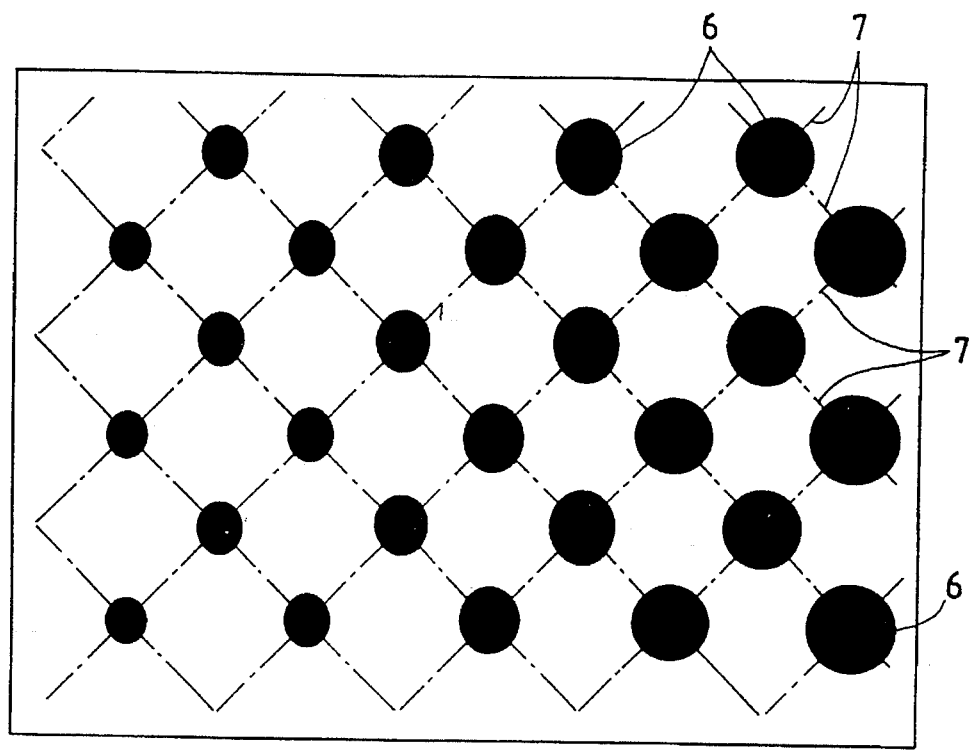
FIG. 11 is a diagram showing the further another circular-dot-type pattern, which is formed by rotating the pattern shown in FIG. 3 by 45 degrees, of light scattering and transmissive areas and/or light diffusing and reflective areas on a light conducting plate, as well as an example of the imaginary lines as formed by connecting those areas.
Figure 12:
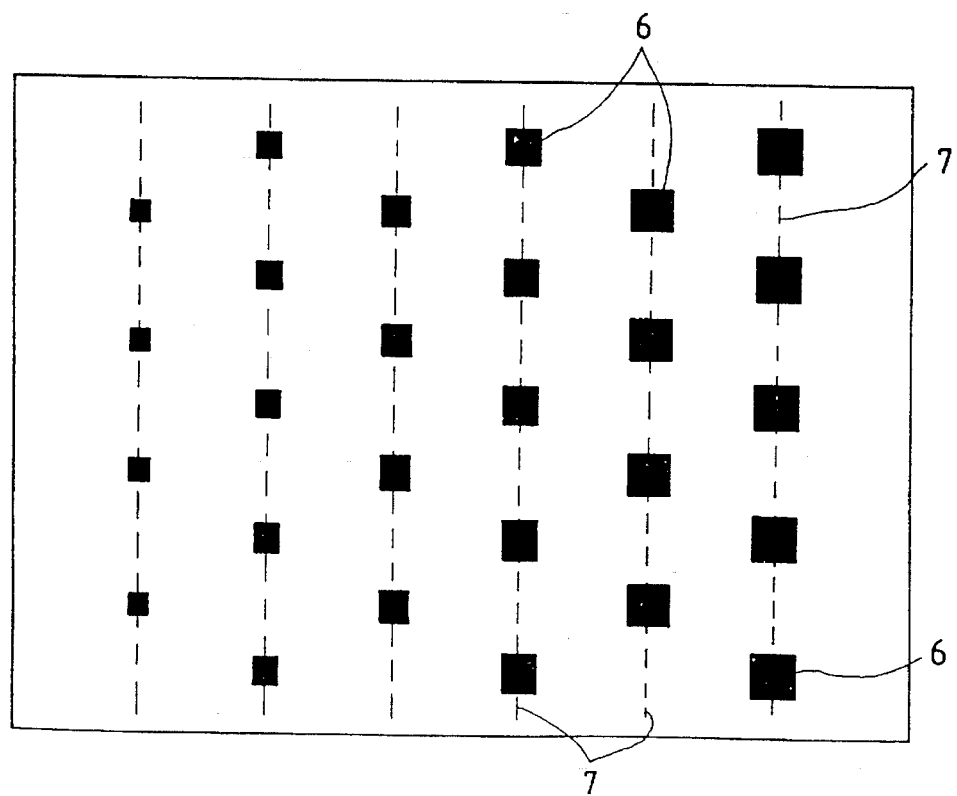
FIG. 12 is a diagram showing a square-dot-type pattern of light scattering and transmissive areas and/or light diffusing and reflective areas on a light conducting plate, as well as an example of the imaginary lines as formed by connecting those areas.

The term "imaginary lines that would be drawn when the light diffusing elements are formed on the light conducting plate" in the present invention means those imaginary lines which serve as a reference for positioning the light diffusing elements to be formed on the light conducting plate by any one of the ordinary methods described hereinabove. An example of these imaginary lines is shown in FIG. 3, 9, 10, 11 and 12 in which numeral 6 designates light diffusing elements that are typically formed of a light diffusing substance, and 7 refers to the imaginary lines under consideration. That is, in the case where the light diffusing elements of the dot-type are formed on the light conducting plate, the imaginary line would be drawn by connecting the centers of most adjacent dots which have the shortest distance between the centers thereof, as shown in FIGS. 3, 11 and 12. In addition, in the case where the light diffusing elements of the stripe-type are formed on the light conducting plate, the imaginary line would be drawn by connecting the center lines of the stripes so as to have the shortest distance therebetween, as shown in FIG. 10. Such are the lines that intersect the straight ridgelines on the sheet to be described hereinafter that is made of a light-transmissive material.

When light diffusing elements are formed in stripes on the surface of the light conducting plate by a suitable method such as a coating or cutting technique, the elements will normally provide stripes that are substantially parallel to the linear light source to be described hereinafter.

The substantially parallel, imaginary lines which would be drawn on the light conducting plate are preferably spaced apart by distances of 0.01 mm to 5 mm. If their spacing exceeds 3 mm, the shape of the light diffusing elements themselves will clearly be seen through the sheet; if the spacing is less than 0.03 mm, the production yield will drop markedly. Therefore, the spacing between adjacent imaginary lines is preferably within the range from 0.03 mm to 2 mm.

Shown by 4 in FIGS. 1 and 2 is the linear light source and, in a preferred embodiment, it is covered with a light reflector 5 in such a way as to provide a certain clearance between its outer surface and the inner surface of the said reflector. The light reflector has a slit for admitting light to be incident on an end portion of the light conducting plate; the reflector is formed of a specular reflective sheet typically made of Ag, Al or the like, or it may be formed of a light reflective polyethylene terephthalate (PET) sheet that is given light diffusing quality by treatment with $BaSO_4$, $TiO_2$, air bubbles or the like. The light source 4 is provided in proximity to at least one end face portion of the light conducting plate in such a way that its central axis is substantially parallel to either end face of the light conducting plate. The linear light source 4 may be selected from among various types including a fluorescent tube, a tungsten incandescent tube, an optical rod and an array of LEDs, and a fluorescent tube is preferred. From the viewpoint of lower power consumption, it is preferred that the length of the portion capable of uniform light emission except the electrode portion is substantially equal to the length of the end portion of the light conducting plate in proximity to that emitting portion.

The specular reflective sheet typically made of Ag or Al, or the PET reflective sheet which is given light diffusing quality by treatment typically with $BaSO_4$, $TiO_2$ or air bubbles (indicated by 3 in FIGS. 1 and 2) is provided in such a way as to cover substantially all part of the face of the light conducting plate on which the light diffusing elements are formed.

Shown by 2 in FIGS. 1 and 2 is the sheet that is made of a light-transmissive material and it has a multiple of parallel prisms (see FIG. 4) or raised structures (see FIG. 5) that have straight ridgelines and which are formed at small intervals on the same side. The sheet 2 is provided on the exit face of the light conducting plate in such a way that the ridgelines will face outward (to the side opposite the side facing the light conducting plate). The shape of the prisms is in no way limited to the case shown in FIG. 4 and they may be of such a shape that the oblique sides of an individual prism differ in length.

In its first aspect, the present invention is characterized in that at least one light transmissive sheet is provided on the exit face of the light conducting plate in such a way that the straight ridgelines intersect the imaginary lines which would be drawn when the light diffusing elements are formed on said light conducting plate. The sheet, if it is provided in this manner, changes the directivity of the light issuing from the exit face of a backlighting device in such a way that the directivity of light in directions close to a line dropped perpendicular to the exit face is enhanced; as a result, one can fabricate a backlighting device that not only achieves efficient conversion from power consumption to luminance but also insures that the shape of light diffusing elements formed in dots or stripes is effectively hidden from the human vision.

If necessary, a conventional light diffusing sheet may additionally be provided and because of the above-described advantage of the present invention, the light diffusing quality of that additional sheet may be much lower than is necessary for the conventional types. Hence, the additional light diffusing sheet will permit better transmittance of rays of light and there will be little drop in luminance even if it is provided between the light conducting plate and the sheet of the present invention. It should also be noted that the additional light diffusing sheet may be provided exterior to the sheet of the present invention and yet the directivity of light that is achievable by the latter sheet will little change.

The sheet to be used in the present invention which is made of a light-transmissive material is described below more specifically. The sheet may be made from any light-transmissive material, as selected from among polymethacrylate esters, polycarbonates, polyvinyl chloride, polystyrenes, polyamides, polyesters, polyethylenes, polypropylenes, cellulosic resins, glass, etc.

Figure 4:
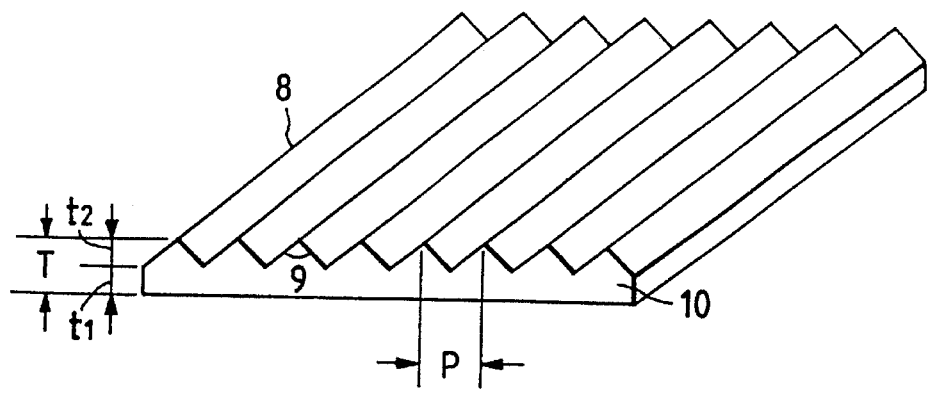
FIG. 4 is a diagram showing an example of the light diffusing sheet.

An example of the sheet that can be used in the first aspect of the present invention is one having parallel straight ridgelines that are formed on the side from which light emerges. As shown in FIG. 4, the straight ridgelines may be those of "prisms" each having at least two optical planes and the ridgelines (indicated by 8) on which two optical planes meet are straight and a multiple of lineal prisms that are parallel to one another are present in the same plane at small intervals (indicated by P). Those ridgelines which are formed on the sheet have portions of such a shape that the vertical angles are substantially the same and this means that when the prisms are cut through the vertex under the same conditions, their vertical angles are essentially the same.

Each of the vertical angles of the ridgelines on the sheet (as indicated by 9 in FIG. 4) is preferably in the range from 70 to 150 degrees. The more preferred range of vertical angles depends on the refractive index of the material of the sheet to be used and on the luminous intensity distribution characteristics of the flat light emitter to be used. Consider, for example, the case where a material having high refractive index (i.e., polycarbonate; n=1.59) is used; if the vertical angle of interest is less than 90 degrees, the light issuing from the flat light emitter will emerge in directions other than those near a line dropped perpendicular to the exit face, and if the vertical angle exceeds 110 degrees, the directivity of light in directions near the normal line defined above will drop. Hence, it is particularly preferred that the vertical angle of the ridgelines on the sheet of the present invention lies within the range from 90 to 110 degrees.

Figure 5:
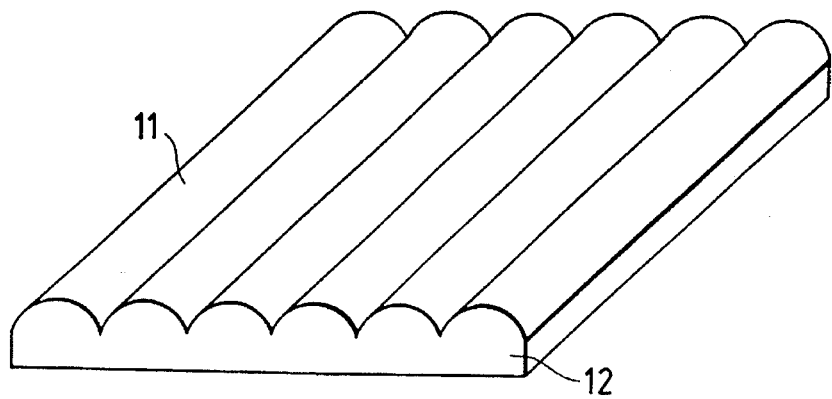
FIG. 5 is a diagram showing another example of the light diffusing sheet.

Another example of the sheet that can be used in the present invention is one having such raised structures that their ridgelines are each shaped like an arc of a circle (as indicated by 11 in FIG. 5). The shape of the raised structures is in no way limited as long as their ridgelines run substantially parallel to one another; to name just a few examples, the raised structures may be dome-shaped, circular, elliptical or shaped like a sine wave.

The sheet having such raised structures is more preferably than the sheet having the prism-shaped ridgeline in view of the fact that it is difficult to see the light diffusing elements through the sheet.

In order to insure that the distance between adjacent ridgelines formed on the sheet are difficult to discern by the human eye under the light issuing from the surface, any two adjacent ridgelines are preferably spaced apart by a distance of 1 to 1,000 µm, preferably 10 to 1,000 µm. Particularly in the case where the backlighting device of the present invention is to be used on a liquid-crystal display, the distance between ridgelines formed on the sheet is preferably adjusted to be smaller than the pitch of liquid-crystal pixels, especially no more than a third of the pitch (if the pitch of liquid-crystal pixels is 0.3 mm, the distance between ridgelines formed on the sheet is 0.3 mm or less, more preferably 0.1 mm or less) to suppress the formation of a spatial moiré pattern between pixels on the liquid-crystal display and the many ridgelines formed on the sheet of the backlighting device of the present invention.

The thickness of that part of the sheet where the ridgelines are formed (as denoted by $t_2$ in FIG. 4) is determined by the vertical angle of each ridgeline or the size of each arc of a circle and by the distance between adjacent ridgelines. It is at least necessary to provide a certain thickness (as denoted by $t_1$) for maintaining a number of straight ridgelines at small intervals and in relative positions that are parallel to one another; this thickness $t_1$ is preferably as small as possible in order to insure high transmittance of light rays and to fabricate a thin backlighting device. However, from the viewpoint of workmanship in the manufacture of sheets and in order to insure adequate strength, the total thickness (T) of the sheet is typically 10 to 3,000 µm, preferably 50 to 1,000 µm. To achieve better results, the straight ridgelines to be formed on the same side of the sheet are preferably shaped identically.

The method of shaping the sheets to be used in the present invention is in no way limited and various methods can be adopted as exemplified by molding with a hot press, embossing, casting, applying a uv curable resin on to a base film, chemical treatments, and any other methods that yield sheets having a multiple of substantially identical linear ridgelines at small intervals and parallel to one another. Because of process limitations in the manufacture of sheets, a certain degree of sag will occur in the ridgelines but this is acceptable as long as it is within the range where the effectiveness of the present invention is assured.

Preferably, the sheet under consideration should not make optical contact with the light conducting plate (as by interposing an air layer) and, hence, it is preferred to avoid optical contact between the two members by slightly roughening the side of the sheet that faces the light conducting plate or by providing a pacer element.

A liquid-crystal display presents a lower contrast as the angle the line of vision forms with a line dropped perpendicular to the screen increases; therefore, the luminance as measured in directions close to the normal line defined above is an important factor in practical applications. This is all the more important for a viewfinder which is looked at only in directions parallel to the line normal to the image plane.

In the present invention, the sheet having a number of parallel lineal prisms arranged at small intervals on the side where outgoing rays of light emerge is provided on the exit face of the backlighting device as described hereinabove and this creates directivity of light. The improved light directivity is apparent from the following typical phenomena: first, the luminance of light from the exit face as measured in a direction substantially parallel to a line dropped perpendicular to that exit face is higher than in the case where none of the sheets described above are provided; second, the luminance as measured in a direction at an angle of, say, 40 degrees with a line dropped perpendicular to that exit face is significantly lower than the value as measured in a direction substantially parallel to that normal line (in a typical case, the drop is almost 50% of the reference value).

Figure 6:
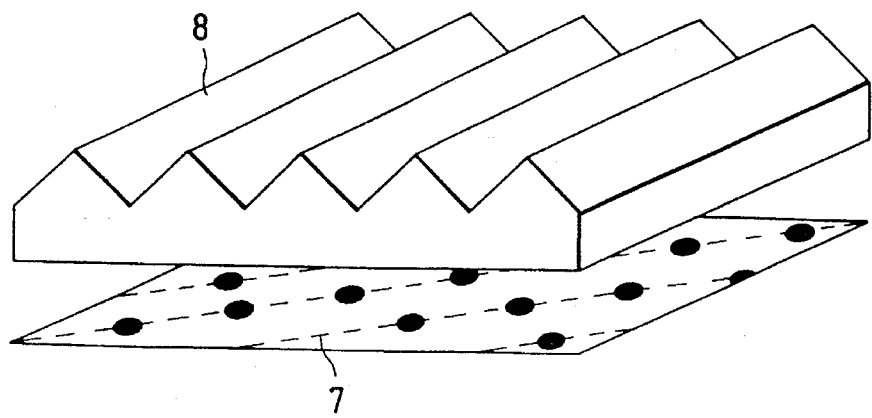
FIG. 6 is a diagram showing an example of the positional relationship between the light transmissive sheet and the imaginary lines as formed with the light scattering and transmissive areas and/or the light diffusing and reflective areas on the light conducting plate.
Figure 7:
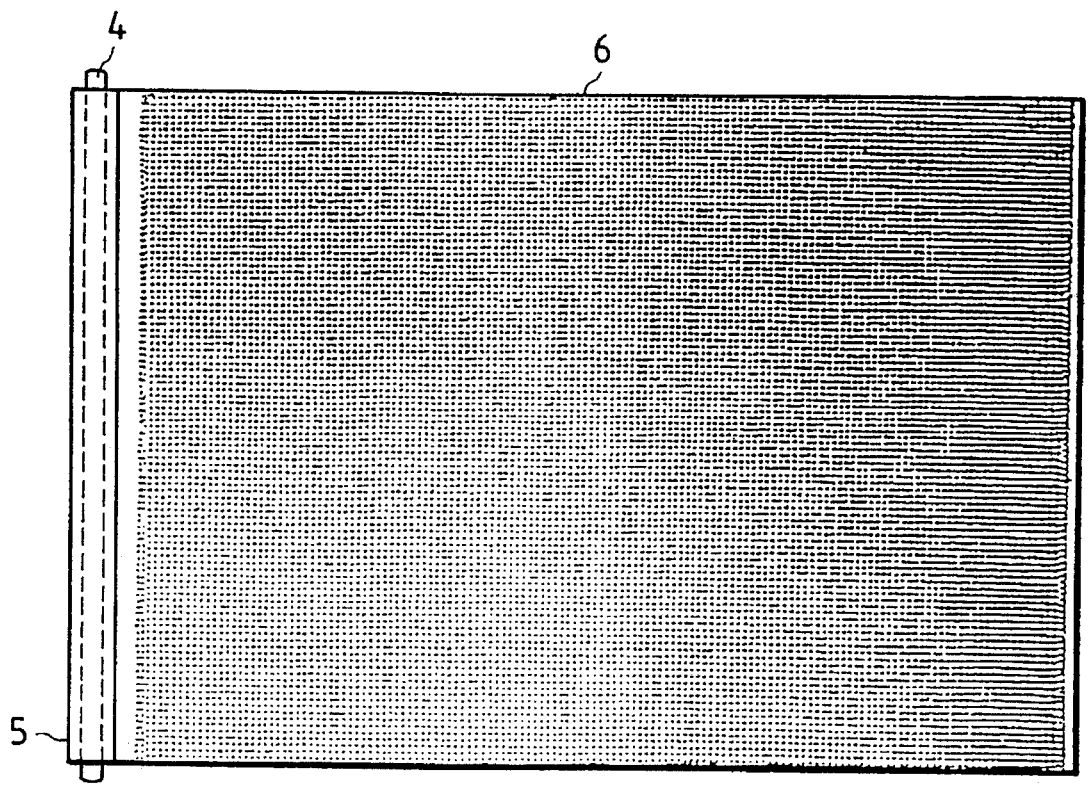
FIG. 7 is a diagram showing a exemplary pattern of the light scattering and transmissive areas and/or the light diffusing and reflective areas on the light conducting plate.

The first aspect of the present invention is characterized in that at least one sheet that is made of a light-transmissive material and which has substantially parallel ridgelines of the type described above is provided on the exit face of the light conducting plate in such a manner that those ridgelines intersect the substantially parallel imaginary lines which would be drawn on the conducting plate. The manner of this intersection is illustrated more specifically in FIG. 6; as shown, the sheet is provided on the exit face of the light conducting plate in such a way that the ridgelines 8 on the sheet intersect the substantially parallel imaginary lines 7 on the light conducting plate.

If the sheet is provided on the exit face of the light conducting plate in the manner described above (i.e., the ridgelines on the sheet intersect the imaginary lines on the light conducting plate), the sheet will have an enhanced ability to hide the shape of the light diffusing elements formed on the light conducting plate. Stated more specifically, the sheet gives a visual illusion about the shape of the light diffusing elements in dots or stripes as if such elements were also formed spatially in those areas of the light conducting plate where they are not actually formed. This visual effect is attained by the optical action of the sheet which is provided on the exit face of the light conducting plate in such a way that the ridgelines on the sheet intersect the imaginary lines or stripes on the light conducting plate.

Stated specifically, the ridgelines on the sheet may be held to "intersect" the imaginary lines on the light conducting plate if the former are not parallel to the latter.

Stated more specifically, it is preferred that the ridgelines on the sheet intersect the imaginary lines on the light conducting plate substantially at angles of 10 to 70 degrees (at minimum). Even if the angle of intersection is outside this range, the sheet maintains the ability to hide the shape of the light diffusing elements formed in dots or stripes; however, a greater hiding power is exhibited in the range 10 to 70 degrees, with angles near 45 degrees being particularly preferred.

In the case where the square shape is defined by intersecting the imaginal lines as shown in FIGS. 3 and 11 and also the patterns are shown in FIGS. 10 and 12, it is preferred that the ridgelines on the sheet intersect the imaginary lines on the light conducting plated substantially at angles of 20 to 70 degrees. That is, a greater hiding power is exhibited in the range 20 to 70 degrees, with angles near 45 degrees being preferred.

Figure 9:
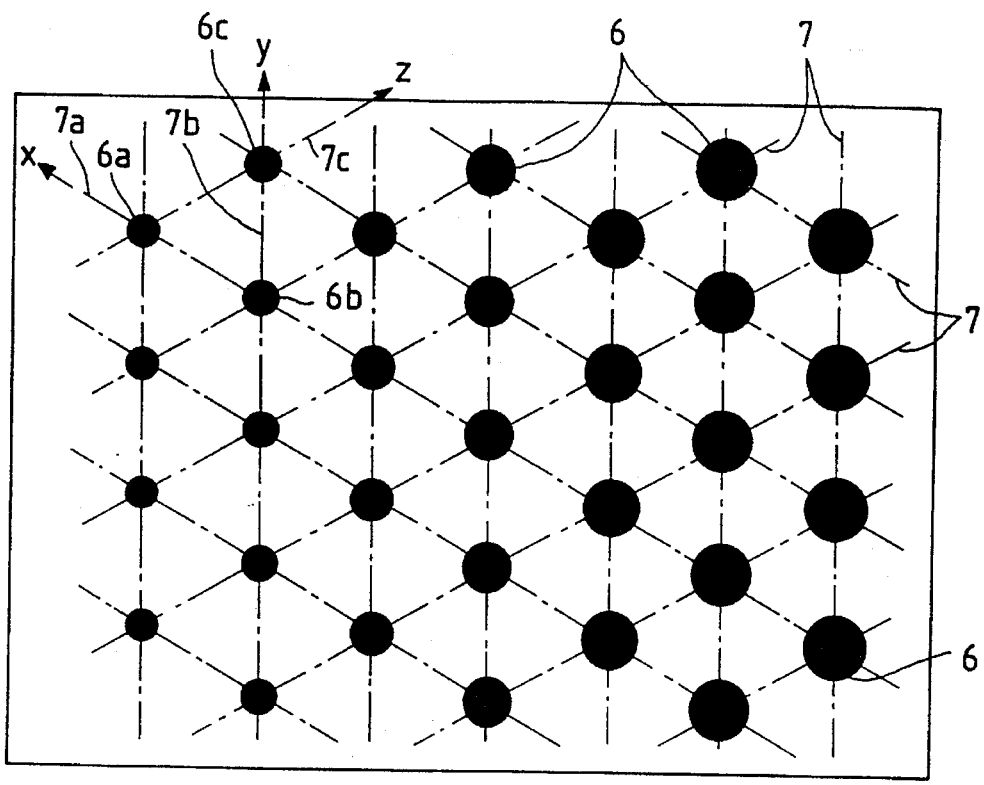
FIG. 9 is a diagram showing the aother circlular-dot-type pattern of light scattering and transmissive areas and/or light diffusing and reflective areas on a light conducting plate, as well as an example of the imaginary lines as formed by connecting those areas.

In addition, in the case where the triangle shape is defined by intersecting the imaginal lines as shown in FIG. 9, it is preferred that the ridgelines on the sheet intersect the imaginary lines on the light conducting plated substantially at angles of 10 to 50 degrees. That is, a greater hiding power is exhibited in the range 10 to 50 degrees, with angles near 30 degrees being preferred.

If two or more sheets are used in superposition, there is achieved a further increase in luminance compared to the case where only one sheet is used; in this alternative case, two or more sheets are preferably superposed in such a way that the ridgelines on one sheet intersect the ridgelines on an adjacent sheet in order to assure more enhanced ability to hide the shape of the light diffusing elements formed in dots or stripes.

Stated more specifically, it is preferred that the ridgelines on one sheet intersect the ridgelines on an adjacent sheet substantially at angles of 75 to 115 degrees. Even if the angle of intersection is outside this range, the superposed sheets maintain the ability to hide the shape of the light diffusing elements formed in dots or stripes; however, a greater hiding power is exhibited in the range 75 to 115 degrees, with angles near 90 degrees being particularly preferred. If this condition is met, an improvement in luminance is also accomplished.

In addition, as shown in FIG. 9, in the case where the light diffusing elements are formed on the light conducting plate in dots patterns in which three imaginary lines (7a, 7b and 7c) each containing a segment (6a–6b, 6b–6c, and 6a–6c) of line between adjacent dot centers (6a, 6b and 6c), intersecting each another and extending in directions (arrows x, y and z) different from each another are defined, the sheet having the parallel straight ridgelines (8) shown in FIG. 4 according to the above-mentioned example of the present invention is positioned in such a manner that the straight ridgelines (8) of the sheet intersect at least two imaginary lines (7a, 7c) formed on the light conducting plate. Thereby, one can fabricate a backlighting device that not only achieves efficient conversion from power consumption to luminance but also insures that the shape of light diffusing elements formed in dots is effectively hidden from the human vision.

Examples, in which the light diffusing elements are formed on the surface of the light conducing plate so that the centers of the adjacent dots of the light diffusing elements are separated at the same intervals, are shown in FIGS. 3 and 11. In these drawings, the reference numeral 7 designates the imaginal lines. In addition, an example in which the light diffusing elements are provided in the form of the stripe condition and an example in which the light diffusing elements of the square-dot-type are formed are respectively drawn in FIGS. 10 and 12. As shown by FIGS. 10 and 12, the imaginal lines 7 in the present invention are formed by connecting the dot centers of the adjacent dots with the shortest distance therebetween or by connecting the center lines of the stripes with the shortest distance therebetween.

The present inventors also found that the object of the invention could effectively be attained when a medium containing a light scattering and transmissive substance and/or a light diffusing and reflective substance was applied onto one of the two major surfaces of the light conducting plate by screen printing or some other method in such a manner that those areas of the light conducting plate where the medium was applied would be permit 40% or more transmittance of parallel rays of light as measured in accordance with JIS K 7105.

If the medium containing a light scattering and transmissive substance and/or a light diffusing and reflective substance is to be screen-printed or otherwise printed on the surface of the light conducting plate in dots or stripes or in other patterns, the size of those substances is preferably adjusted to be no greater than the openings in the screen to be used which are determined by its mesh size and the wire diameter. Consider, for example, the use of a screen that has openings of the size 51 µm. In this case, the light-scattering and transmissive substance and/or the light diffusing and reflective substance to be used must have a maximum outer dimension not exceeding 51 µm; from the viewpoint of printing yield, their maximum outer dimension is preferably 20 µm or less, more preferably 5 µm or less. It is also preferred that the size of the light scattering and transmissive substance and/or the light diffusing and reflective substance is no more than about one tenth of the diameter of the smallest dots to be applied on to the surface of the light conducting plate.

In the second aspect of the present invention, it is essential that those areas of the light conducting plate to which the light scattering and transmissive substance and/or the light diffusing and reflective substance have been applied should permit 40% or more transmittance of parallel rays of light upon measurement in accordance with JIS K 7105, provided that those substances have been applied (dried) under the same conditions as those for 100% coverage, namely, for the case where they are applied to the entire part of one of the two major surfaces of the light conducting plate. Preferably, the transmittance of parallel rays of light through the covered areas is at least 40% but less than 70%. The term "coverage" as used herein means the proportion at which the light scattering and transmissive substance and/or the light diffusing and reflective substance is applied per unit area of the light conducting plate.

Figure 8A:
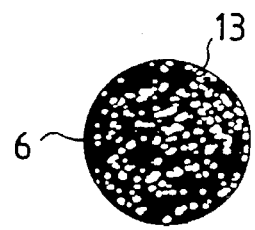
FIGS. 8a and 8b are diagrams showing two examples of the light scattering and transmissive area and/or the light diffusing and reflective area.
Figure 8B:
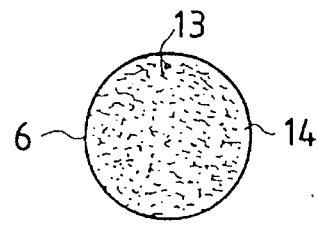

The above description may be better understood by schematic presentation as made in FIG. 8b, which shows that the light scattering and transmissive areas and/or the light diffusing and reflective areas, as applied on to the surface of the light conducting plate, are such that the light scattering and transmissive substance and/or the light diffusing and reflective substance are dispersed fairly sparsely within a light transmissive substance (e.g., a dispersion medium such as an acrylic resin or a vinyl resin). The effect of this state of dispersion is as follows: even if ray of light traveling through the light conductive plate while experiencing repeated total reflection impinge against areas where the medium containing the light scattering and transmissive substance and/or the light diffusing and reflective substance has been applied (as indicated by 6 in FIG. 8), those rays of light which have not struck the substances per se (as indicated by 13) will not emerge from the exit face of the light conducting plate but will keep travelling through the conducting plate as they experience repeated total reflection. As a result, the areas of the light conducting plate to which the medium containing the light scattering and transmissive substance and/or the light diffusing and reflective substance is to be applied (namely, their coverage of the light conducting plate) can be made larger than has been possible in the prior art. This state of dispersion of the light scattering and transmissive substance and/or the light diffusing and reflective substance in the light-transmissive substance can be expressed in terms of the transmittance of parallel rays of light as measured in accordance with JIS K 7105.

Stated more specifically, if other conditions are equal, the transmittance of parallel rays of light approaches 100% as the light scattering and transmissive substance and/or the light diffusing and reflective substance are more sparsely dispersed in the light-transmissive substance, but it approaches 0% as those substances are dispersed more densely. In the prior art, the state of the light scattering and transmissive areas and/or the light diffusing and reflective areas has been as shown in FIG. 8a, where the light scattering and transmissive substance and/or the light diffusing and reflective substance are applied on to the light conducting plate as they are densely distributed in the dispersion medium.

The state in which the light scattering and transmissive substance and/or the light diffusing and reflective substance are dispersed fairly sparsely in the second aspect of the present invention is characterized by the fact that the areas where those substances are applied permit 40% or more transmittance of parallel rays of light as measured in accordance with JIS K 7105. Preferably, the value of that transmittance is at least 50%.

Not only the light conducting plate to be used in the present invention but also those light conducting plates which are actually used with areal illuminators mostly have the light scattering and transmissive substance and/or the light diffusing and reflective substance applied in dots or stripes on their surface, with the coverage being less than 100%. Therefore, if the surface of such conducting plate is measured for the transmittance of parallel rays of light in accordance with JIS K 7105, the result will in most cases be greater than the value for the medium itself which contains the light scattering and transmissive substance and/or the light diffusing and reflective substance.

Consider further the case of measuring the transmittance of parallel rays of light on the areas of the light conducting plate to which the light scattering and transmissive substance and/or the light diffusing and reflective substance have been applied for a coverage of less than 100%; the rays of light that are used in the measurement will pass through the clear portions of the light conducting plate (i.e., where the medium containing the light scattering and transmissive substance and/or the light diffusing substance has not been applied) substantially in a parallel fashion excepting the surface reflected component which accounts for only a few percent of the incident rays and, therefore, the transmittance of parallel rays of light through those areas of the light conducting plate where the substances of interest have been applied will vary almost linearly with the coverage by the medium containing those substances.

The range of transmittances of parallel rays of light as specified in the present invention assumes that the "coverage" in the sense of the term defined above is 100%. Therefore, if the areas of a light conducting plate that permits 100% transmittance of parallel rays of light and to which the medium containing the light scattering and transmissive substance and/or the light diffusing and reflective substance has been applied for 50% coverage allows 50% transmittance of parallel rays of light, the transmittance of parallel rays of light may safely be regarded as almost 0% if the coverage is 100%.

If the transmittance of parallel rays of light as defined in the present invention is 65% or more, the coverage of the light conducting plate with the light-transmissive substance (i.e., a dispersion medium such as an acrylic resin or a vinyl resin) will increase to such an extent that the absorption of light rays by that transmissive substance is no longer negligible; in addition, the amount of rays that will experience repeated reflection within the light conducting plate increases so abruptly that more rays will strike (or return to) substances that absorb the light in the light conducting plate or the light from the linear light source and the like. Under the circumstances, the transmittance of parallel rays of light as defined in the present invention is preferably less than 70%, more preferably less than 65%.

The proportion of the light scattering and transmissive substance and/or the light diffusing and reflective substance (or the medium containing them) as relative to the light-transmissive substance (i.e., a dispersion medium such as an acrylic resin or a vinyl resin) is dependent on the medium for containing those substances; as guide figures, the relative proportion is no more than a third, preferably no more than a fourth, of the weight of the light-transmissive substance.

Thus, the condition specified for the second aspect of the present invention can be satisfied by controlling the concentration of the light scattering and transmissive substance and/or the light diffusing and reflective substance which are to be applied on to the surface of the light conducting plate; if desired, the condition of interest (i.e., the transmittance of parallel rays of light be at least 40% but less than 70%) can also be satisfied by controlling the thickness of the light scattering and transmissive areas and/or the light diffusing and reflective areas.

Thus, the transmittance of parallel rays of light as specified in the present invention is referenced to the value as obtained by measurement in accordance with JIS K 7105 on the surface of the light conducting plate to which the light scattering and transmissive substance and/or the light diffusing and reflective substance have been applied under the same conditions as those adopted to attain 100% coverage.

It should be added to say that the higher the transmittance of parallel rays of light that is exhibited by the areas where the medium containing the light scattering and transmissive substance and/or the light diffusing and reflective substance has been applied, the larger the size of the light scattering and transmissive areas or the light diffusing and reflective areas that one can provide in the neighborhood of the light source (if those areas are formed of dots, the dot size can be increased); therefore, the shape of the light scattering and transmissive areas or the light diffusing and reflective areas per se is less discernible by the human eye and one can fabricate a thin light conducting plate without unduly increasing the number of light diffusing sheets and without lowering the printing yield.

Figure 13:
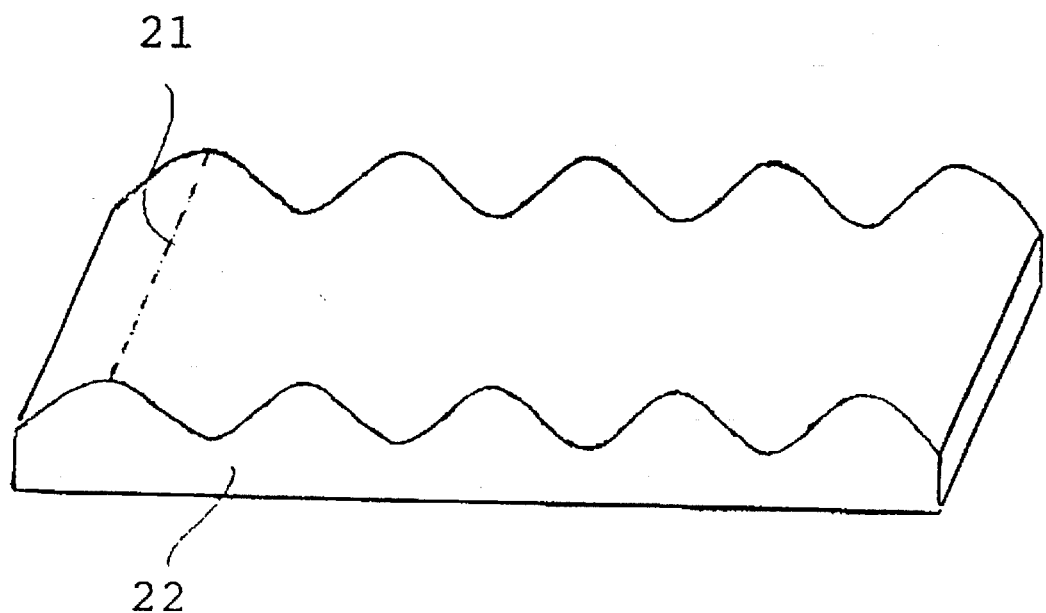
FIG. 13 is a diagram showing an example of the light diffusing sheet.
Figure 14:
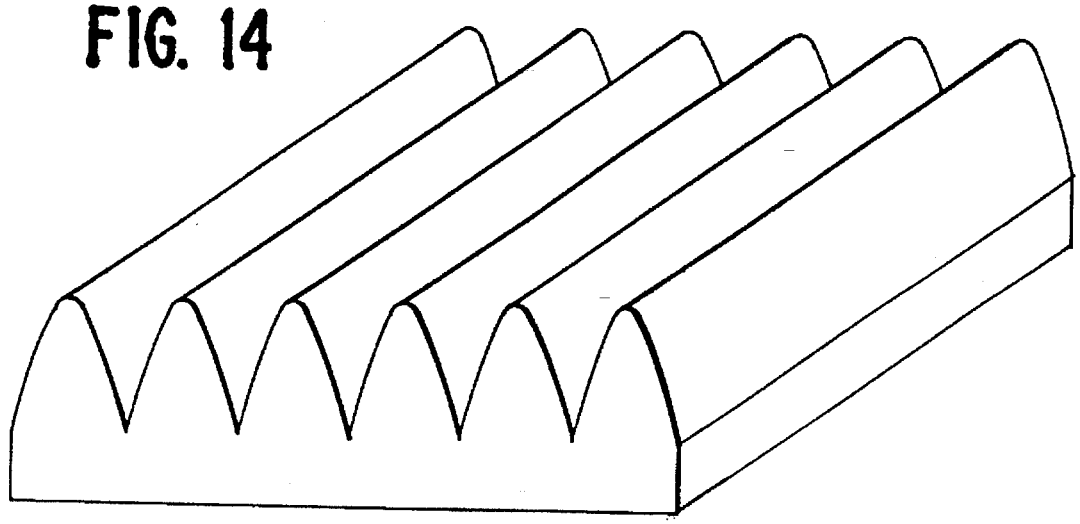
FIG. 14 is a diagram showing another example of the light diffusing sheet.
Figure 15:
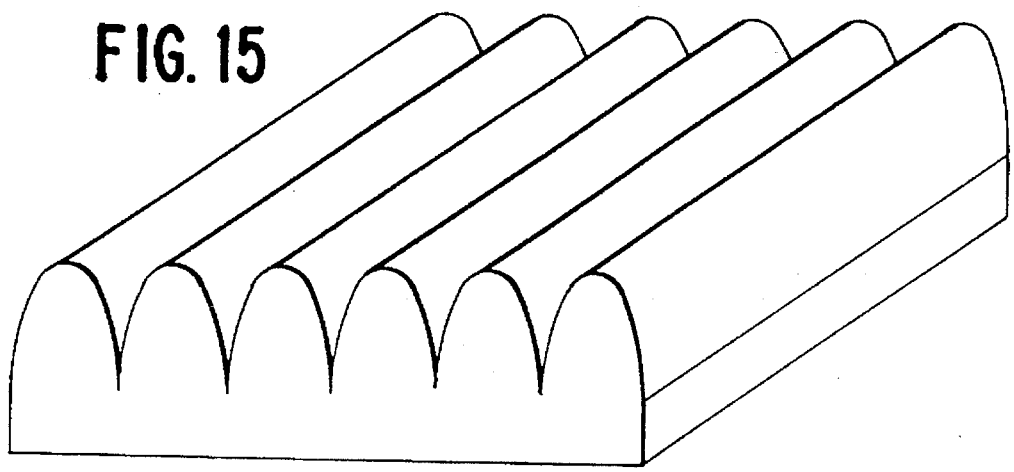
FIG. 15 is a diagram showing another example of the light diffusing sheet.

The structure except for the light diffusing elements is the same as the afore-mentioned embodiments. However, the configuration of the light transmissive sheet (light diffusing sheet) which is provided on the light emitting surface of the light conducing plate is not limited. For example, a sheet having roughened surface, a sheet having a prism-shaped structure shown FIG. 4 or a sheet having an arc-shaped raised structure shown in FIG. 5 can be used. Also, a sheet having sine wave shape, domed-shape or elliptical structures, as shown in FIGS. 13, 14, and 15, respectively, can be used.

Having its principal part constructed in the manner described above, the backlighting device of the present invention is suitable for use with panels, especially liquid-crystal display panels. Preferably, this device may be modified to incorporate the following design features.

First, as regards the light diffusing elements which are formed typically in dots or stripes on the surface of the light conducting plate, the shape of dots is in no way limited and they may be circular, rectangular or in the form of crossed lines. These dots are formed at the points where any two straight imaginary lines spaced apart on the light conducting plate intersect at right angles. The spacing between crossed lines is preferably 0.01 to 5 mm, more preferably 0.03 to 2 mm, and a specific spacing is selected as appropriate for the thickness of the light conducting plate.

If the light diffusing elements are to be coated on the surface of the light conducting plate, its coverage is preferably 1 to 50% in the neighborhood of the linear light source and 20 to 100% in the area farthest from the light source. It is also preferred that the coverage with the light diffusing elements increases progressively with the increasing distance from the light source, the measurement starting with the point on the light conducting plate which is covered with those elements in the end portion of one side in close proximity to the linear light source. The term "coverage" as used hereinabove means the proportion at which the surface of the light conducting plate is covered with the light diffusing elements per unit area of said conducting plate.

It is also preferred in the present invention that the light diffusing elements are applied on to the light emissive surface at the points of intersection that are aligned parallel to the axis of the linear light source in such a way that the coverage with those elements increases progressively with the distance from the center line across the surface of the light conducting plate to the light diffusing elements in direction toward opposite sides, said center line being dropped from the center of said parallel lines (i.e., from the center of the length of the linear light source) in a direction perpendicular to said light source. The backlighting device of the present invention is used with an optical display panel such as a liquid-crystal panel being mounted on top of the surface from which light emerges.

ADVANTAGES OF THE INVENTION

The present invention provides a backlighting device that is capable of efficient conversion from power consumption to luminance, that insures the light diffusing elements on the light conducting plate to be hidden by a satisfactory degree and which yet is fairly thin.

EXAMPLES AND COMPARATIVE EXAMPLES

Comparative examples and working examples of the present invention are described below in order to further illustrate the present invention. A rectangular light conducting plate (AC-999 of Asahi Chemical Industry Co., Ltd.; made of PMMA; 210 mm×155 mm) having a thickness of 4 mm (see FIG. 1) was provided. A cold-cathode fluorescent tube (product of Harrison Denki K.K.) with a diameter of 3.8 mm was positioned in proximity to both of the longer sides of the light conducting plate. An elliptical Ag film that has a slit 4 mm wide in contact with the light conducting plate and which had the reflecting side face the light source was mounted in such a way that light emerging through the slit would be admitted into the plate from one longer side. Light diffusing elements were formed on the surface of the light conducting plate by printing a titanium white containing paint in a pattern of circular dots that were formed at the points where straight imaginary lines spaced apart by 1 mm on the conducting plate intersected at right angles. The other conditions for dot formation were as follows: i) the coverage with the light diffusing elements was 26% at the point for a minimum value and 90% at the point for a maximum value, with the coverage increasing progressively in the intermediate area; ii) the coverage with the light diffusing elements at the points of intersection that were aligned parallel to the axis of the linear light source increased progressively with the distance from the center line across the surface of the light conducting plate to the light diffusing elements in directions toward the shorter sides, said center line being dropped from the center of said parallel lines (i.e., from the center of the length of the linear light source) in a direction perpendicular to the light source; stated more specifically, the coverage as defined above was 26% at the point for a minimum value and 40% at the point for a maximum value, with the coverage increasing progressively in the intermediate area.

The side of the light conducting plate where the light diffusing elements were printed was covered with a light diffusing and reflective sheet 0.125 mm thick (Melinex 329 of ICI Limited). Further, a light diffusing sheet 0.1 mm thick (D-204 of Tsujimoto Denki Seisakusyo), having roughened surfaces on both sides, was provided at the exit face of the light conducting plate.

The cold-cathode tubes were driven at a constant current (5 mA for each cathode tube, hence, 10 mA for the two cathode tubes) with an alternating voltage of 30 kHz being applied from an inverter (CXAM-10L of TDK Corp.) and the areal luminance produced was measured with a luminance meter (Topcon BM-8) at a view angle of 2 degrees in a direction parallel to a line dropped perpendicular to the exit face; the result was 1300 cd/m$^2$. The dots were not seen through the light diffusing sheet. The directivity of light was almost zero (Comparative Example 1).

A backlighting device was constructed and operated as in Comparative Example 1 except that the light diffusing sheet was replaced by a polycarbonate sheet 250 μm thick that was worked to have a multiple of parallel straight raised structures with adjacent ridgelines spaced apart by 140 μm; this sheet was provided on the light conducting plate in such a way that the straight ridgelines ran parallel to the substantially parallel imaginary lines on the surface of the light conducting plate and that the side of the sheet having the raised structures faced outward. The luminance as measured on this backlighting device was 1800 cd/mm$^2$. The dots were seen through the sheet as if consecutively adjacent dots in a direction perpendicular to the parallel straight ridgelines lined up in a row (stated more concretely, they appeared as meat balls on a spit). The directivity of light was observed in a direction parallel to a line dropped normal to the exit face (Comparative Example 2).

A backlighting device was constructed and operated as in Comparative Example 2 except that the polycarbonate sheet having a multiple of parallel straight raised structures was provided on the light conducting plate in such a way that the straight ridgelines intersected the substantially parallel imaginary lines on the surface of the light conducting plate. The luminance as measured on this backlighting device was 1800 cd/m$^2$. The dots were not seen through the sheet. To check for its ability to hide the shape of dots, the sheet was rotated and it exhibited an even greater hiding power when the straight ridgelines intersected the imaginary lines on the light conducting plate at angles of 20 to 70 degrees. The hiding power was the greatest when the angle of intersection was about 45 degrees. Further, the directivity of light was observed in a direction parallel to a line dropped perpendicular to the exit face (Example 1).

A backlighting device was constructed and operated as in Comparative Example 2 except that one more polycarbonate sheet having a multiple of parallel straight raised structures was used and two such sheets were superposed in such a way that the straight ridgelines on one sheet ran parallel to those on the other sheet. The luminance as measured on this backlighting device was 1850 cd/m². The dots were seen through the sheets as if consecutively adjacent dots in a direction perpendicular to the parallel straight ridgelines lined up in a row (stated more concretely, they appeared as meat balls on a spit). In addition, the two sheets optically interfered with each other to create a visible moiré pattern. The directivity of light was observed in a direction parallel to a line dropped perpendicular to the exit face (Comparative Example 3).

A backlighting device was constructed and operated as in Example 1 except that one more polycarbonate sheet having a multiple of parallel straight raised structures was used and two such sheets were superposed in such a way that the straight ridgelines on one sheet intersected those on the other sheet. The luminance as measured on this backlighting device was 1900 cd/m². The dots were not seen through the sheets. The hiding power of the superposed sheets was found to increase further when the straight ridgelines on one sheet intersected those on the other sheet at angles of 75 to 115 degrees, and the hiding power was the greatest when the angle of intersection was about 90 degrees. The luminance also increased when the straight ridgelines on one sheet intersected those on the other sheet at angles of 75 to 115 degrees, and a maximum luminance (2200 cd/m²) was produced when the angle of intersection was about 90 degrees. Further, the directivity of light was observed in a direction parallel to a line dropped perpendicular to the exit face (Example 2).

A backlighting device was constructed and operated as in Comparative Example 2 except that the polycarbonate sheet having a multiple of parallel straight raised structures was replaced by a polycarbonate sheet 360 µm thick that was worked to have a multiple of parallel linear prisms each having a vertical angle of 90 degrees, with adjacent ridgelines on prisms being spaced apart by 350 µm. The luminance as measured on this backlighting device was 2,000 cd/m². The dots were sen through the sheet as if consecutively adjacent dots in a direction perpendicular to parallel straight ridgelines connected together to form an ellipse (but they did not line up in a row as in Comparative Example 2). The directivity of light was observed in a direction parallel to a line dropped perpendicular to the exit face (Comparative Example 4).

A backlighting device was constructed and operated as in Example 1 except that the polycarbonate sheet was replaced by a sheet having linear prisms which was of the same type as used in Comparative Example 4. The luminance as measured on this backlighting device was 1800 cd/m². The dots were not seen through the sheet. To check for its ability to hide the shape of dots, the sheet was rotated and it exhibited an even greater hiding power when the straight ridgelines on prisms intersected the imaginary lines on the light conducting plate at angles of 20 to 70 degrees. The hiding power was the greatest when the angle of intersection was about 45 degrees. Further, the directivity of light was observed in a direction parallel to a line dropped perpendicular to the exit face (Example 3).

A backlighting device was constructed and operated as in Example 2 except that the two carbonate sheets were replaced by the same number of sheets having linear prisms which were of the same type as used in Comparative Example 4. The hiding power of the superposed sheets was checked and the luminance produced was measured. The sheets exhibited an even greater hiding power when the straight ridgelines on one sheet intersected those on the other sheet at angles of 75 to 115 degrees, and the hiding power was the greatest when the angle of intersection was about 90 degrees. The luminance also increased when the straight ridgelines on one sheet intersected those on the other sheet at angles of 75 to 115 degrees, and a maximum luminance (2,100 cd/m²) was produced when the angle of intersection was about 90 degrees. Further, the directivity of light was observed in a direction parallel to a line dropped perpendicular to the exit face (Example 4).

A rectangular polyacrylic resin plate 1.5 mm (225 mm×127 mm; Delaglass A of Asahi Chemical Industry Co., Ltd.; see FIG. 1) was provided. A cold-cathode fluorescent tube (product of Harrison Denki K.K.) with a diameter of 3.1 mm was positioned in proximity to one of the shorter sides of the conducting plate. The cold-cathode fluorescent tube was enclosed with a Ag film (product of Nakai Kogyo K.K.) having a slit 1.5 mm wide that faced the shorter side of the light conducting plate in such a way that light emerging through the slit would be admitted into the plate from the shorter side.

An ink formulation containing a light scattering and transmissive or a light diffusing and reflective substance (titania) and a light-transmissive substance (acrylic vinyl resin) was screen-printed to form a pattern of circular dots on a pitch of 1 mm. The weight ratio between titania and acrylic vinyl resin was 1:1 and the solvent in the ink was removed during the drying step. The titania had a particle size of no more than 2 µm. A screen-image carrier was prepared in such a way that the coverage with the light scattering and transmissive areas and/or the light diffusing and reflective areas would be 3.8% at the point for a minimum value (in the neighborhood of the linear light source; dot diameter=220 µm) and 95% at the point for a maximum value (in the farthest area of the light conducting plate), with the coverage increasing progressively in the intermediate area. The screen has openings with a size of 51 µm.

After drying the light conducting plate, the printed dots were examined under a microscope; as FIG. 8a shows, titania particles were found to have agglomerated in each dot. The dots formed on the conducting plate were 5 to 8 µm thick. The same ink was printed on the same acrylic resin plate under substantially identical condition except that the coverage was 100%; the transmittance of parallel rays of light in the printed area was found to be 4% by measurement in accordance with JIS K 7105.

A white polyester light diffusing and reflective plate (0.125 mm thick; Melinex 329 of ICI Limited) was positioned in such a way as to cover the entire surface of the side of the light conducting plate which was coated with the light scattering and transmissive or light diffusing and reflective substance. A polycarbonate light diffusing plate (0.18 mm thick; Product No. 8B36 from GE Co.) was positioned in such a way as to cover substantially the entire part of the exit face of the light conducting plate, with the rough side facing away the light conducting plate. The cold-cathode tube was driven at a constant current (tube current, 5 mA) with an alternating voltage (30 kHz) being applied from an inverter and the areal luminance produced was measured with a luminance meter (Topcon BM-8). The luminance distribution was uniform (min/max≧0.8) across the light emissive surface.

In the experiment, the shape of the printed dots per se was discernible by the human eye. The shape of the dots became indiscernible when three light diffusing sheets were used. However, this was not preferred for the purpose of fabricating a thin backlighting device since the overall thicknesses increased by the amount corresponding to the thickness of the two additional light diffusing sheets; what is more, the use of three light diffusing sheets means the increase in the number of device components. As another problem, the smallness of dot diameter caused a lower printing yield (Comparative Example 5).

A backlighting device was constructed and its performance measured as in Comparative Example 5, except that the weight ratio between titania and acrylic vinyl resin was changed to 1:19 and that a screen-image carrier was prepared in such a way that the coverage with the light scattering and transmissive areas and/or the light diffusing and reflective areas would be 7% at the point for a maximum value (in the neighborhood of the linear light source; dot diameter=300 μm) and 95% at the point for a maximum value (in the farthest area of the light conducting plate), with the coverage increasing progressively in the intermediate area. The luminance distribution was uniform (min/max≧0.8) across the light emissive surface.

After drying the light conducting plate, the printed dots were examined under a microscope; as FIG. 8b shows, titania particles were found to be dispersed in the acrylic vinyl resin. The dots which were formed on the conducting plate were 5 to 8 μm thick. The surfaces of the dots were substantially parallel to the surface of the light conducting plate. Titania particles were located substantially inward of the dot surface. The same ink was printed on the same acrylic resin plate under substantially identical conditions except that the coverage was 100%; the transmittance of parallel rays of light in the printed area was found to be 40% by measurement in accordance with JIS K 7105.

In the experiment, the shape of the printed dots per se was discernible to the human eye. The shape of the dots became indiscernible when two light diffusing sheets were used. Thus, the thickness of the device under discussion was smaller than in the case of Comparative Example 5 by the amount corresponding to the thickness of one sheet; in other words, the result was favorable to the purpose of fabricating a thin backlighting device; what is more, the number of device components decreased, thus resulting in a lower cost. As another advantage, the dot diameter was larger than in Comparative Example 5 and this contributed to a better printing yield (Example 5).

A backlighting device was constructed and its performance measured as in Comparative Example 5, except that the weight ratio between titania and acrylic vinyl resin was changed to 1:39 and that a screen-image carrier was prepared in such a way that the coverage with the light scattering and transmissive areas and/or the light diffusing and reflective areas would be 14% at the point for a minimum value (in the neighborhood of the linear light source; for diameter=420 μm) and 100% at the point for a maximum value (in the farthest area of the light conducting plate), with the coverage increasing progressively in the intermediate area. The luminance distribution was uniform (min/max≧0.8) across the light emissive surface.

After drying the light conducting plate, the printed dots were examined under a microscope; as FIG. 8b shows, titania particles were found to be dispersed in the acrylic vinyl resin. The dots which were formed on the conducting plate were 5 to 8 μm thick. The surfaces of the dots were substantially parallel to the surface of the light conducting plate. Titania particles were located substantially inward of the dot surface. The same ink was printed on the same acrylic resin plate under substantially identical conditions except that the coverage was 100%; the transmittance of parallel rays of light in the printed area was found to be 55% by measurement in accordance with JIS K 7105.

In the experiment, the shape of the printed dots per se was discernible to the human eye. The shape of the dots became indiscernible when two light diffusing sheets were used. Thus, the thickness of the device under discussion was smaller than in the case of Comparative Example 5 by the amount corresponding to the thickness of one sheet; in other words, the result was favorable to the purpose of fabricating a thin backlighting devices; what is more, the number of devices components decreased, thus resulting in a lower cost. As another advantage, the dot diameter was larger than in Comparative Example 5 and this contributed to a better printing yield (Example 6).

A backlighting device was constructed and its performance measured as in Comparative Example 5, except that the weight ratio between titania and acrylic vinyl resin was changed to 1:79 and that a screen-image carrier was prepared in such a way that the coverage with the light scattering and transmissive areas and/or the light diffusing and reflective areas would be 28% at the point for a minimum value (in the neighborhood of the linear light source; dot diameter=597 μm) and 100% at the point for a maximum value (in the farthest area of the light conducting plate), with the coverage increasing progressively in the intermediate area. The luminance distribution was uniform (min/max≧0.8) across the light emissive surface.

After drying the light conducting plate, the printed dots were examined under a microscope; as FIG. 8b shows, titania particles were found to be dispersed in the acrylic vinyl resin. The dots which were formed on the conducting plate were 5 to 8 μm thick. The surfaces of the dots were substantially parallel to the surface of the light conducting plate. Titania particles were located substantially inward of the dot surface. The same ink was printed on the same acrylic resin plate under substantially identical conditions except that the coverage was 100%; the transmittance of parallel rays of light in the printed area was found to be 70% by measurement in accordance with JIS K 7105.

In the experiment, the shape of the printed dots per se was discernible to the human eye. The shape of the dots became indiscernible when two light diffusing sheets were used. Thus, the thickness of the device under discussion was smaller than in the case of Comparative Example 5 by the amount corresponding to the thickness of one sheet; in other words, the result was favorable to the purpose of fabricating a thin backlighting device; what is more, the number of device components decreased, thus resulting in a lower cost. As another advantage, the dot diameter was larger than in Comparative Example 5 and this contributed to a better printing yield. However, the average luminance dropped by about 10%, demonstrating lower efficiency in the utilization of light (Comparative Example 6).

A backlighting device was constructed and its performance measured as in Comparative Example 5, except that the weight ratio between titania and acrylic vinyl resin was changed to 1:159 and that a screen-image carrier was prepared in such a way that the coverage with the light scattering and transmissive areas and/or the light diffusing and reflective areas would be 56% at the point for a minimum value (in the neighborhood of the linear light source; dot diameter=844 μm) and 100% at the point for a minimum value (in the farthest area of the light conducting plate), with the coverage increasing progressively in the intermediate area. The luminance distribution was not uniform (min/max≦0.4) across the light emissive surface, with the luminance being lower in the area close to the linear light source than in the area farther away from it. Even when the coverage with the light scattering and transmissive areas and/or the light diffusing and reflective areas was adjusted to 100% in the area of the light conducting plate that was close to the linear light source, the luminance in that area was still low, producing an uneven luminance distribution across the light emissive surface.

After drying the light conducting plate, the printed dots were examined under a microscope; as FIG. 8b shows, titania particles were found to be dispersed in the acrylic vinyl resin. The dots which were formed on the conducting plate were 5 to 8 μm thick. The surfaces of the dots were substantially parallel to the surface of the light conducting plate. Titania particles were located substantially inward of the dot surface. The same link was printed on the same acrylic resin plate under substantially identical conditions except that the coverage was 100%; the transmittance of parallel rays of light in the printed area was found to be 81% by measurement in accordance with JIS K 7105.

In the experiment, the shape of the printed dots per as was discernible to the human eye. The shape of the dots became indiscernible when two light diffusing sheets were used. Thus, the thickness of the device under discussion was smaller than in the case of Comparative Example 5 by the amount corresponding to the thickness of one sheet; in other words, the result was favorable to the purpose of fabricating a thin backlighting device; what is more, the number of device components decreased, thus resulting in a lower cost. As another advantage, the dot diameter was larger than in Comparative Example 5 and this contributed to a better printing yield. However, the average luminance dropped by about 10%, demonstrating lower efficiency in the utilization of light (Comparative Example 7).

A backlighting device was constructed and operated as in Example 1 except that the light diffusing elements were formed on the surface of the light conducting plate by printing a titanium white containing paint in a pattern of circular dots that were formed at the points where straight imaginary lines spaced apart by 1 mm on the conducting plate intersected with angle of 30 degree (at minimum), as shown in FIG. 9. To check for its ability of hide the shape of dots, the sheet was rotated relative to the light conducting plate and it exhibited an even greater hiding power when the straight ridgelines intersected the imaginary lines on the light conducting plate at angles of 13 to 47 degree, and the hiding power was the greatest when the angle of intersection was about 30 degrees. Further, the directivity of light was observed in a direction parallel to a line dropped perpendicular to the exit face. (Example 7).

A backlighting device was constructed and operated as in Example 1 except that the light diffusing elements were formed on the surface of the light conducting plate by printing a titanium white containing paint in a pattern of stripe-shape that was formed at the lines where straight imaginary lines spaced apart by 1 mm on the conducting plate extended in parallel each other, as shown in FIG. 10. To check for its ability of hide the shape of stripes, the sheet was rotated relative to the light conducting plate and it exhibited an even greater hiding power when the straight ridgelines intersected the imaginary lines on the light conducting plate at angles of 20 to 70 degree, and the hiding power was the greatest when the angle of intersection was about 45 degrees. Further, the directivity of light was observed in a direction parallel to a line dropped perpendicular to the exit face. (Example 8).

In addition, a backlighting device was constructed and operated as in Example 1 except that the light conducting plate had a thickness of 1 mm and the pattern of circular dots with the straight imaginary lines that was formed by turning the pattern shown in FIG. 3 by 45 degree. The luminance as measured on this backlighting device was 1800 cd/m². The dots were not seen through the sheet. To check for its ability to hide the shape of dots, the sheet was rotated and it exhibited an even greater hiding power when the straight ridgelines intersected the imaginary lines on the light conducting plate at angles of 20 to 70 degrees. The hiding power was the greatest when the angle of intersection was about 45 degrees. Further, the directivity of light was observed in a direction parallel to a line dropped perpendicular to the exit face. (Example 9).

While the invention has been described in detail and with reference to specific examples thereof, it will be apparent to one skilled in the art that various changes and modifications can be made therein without departing from the spirit and scope thereof.

What is claimed is:

1. A backlighting device for use with display panels that has a plurality of light diffusing elements on one of the two major faces of a light conducting plate that comprises a light-transmissive material, said device comprising a linear light source provided in proximity to the end portion of at least one side of said light conducting plate, wherein at least a first sheet, comprising a light-transmissive material and having a multiple of prisms or raised structures having at least one of apices and minima defining straight ridgelines of said structures at small intervals on a same side of said first sheet in such a manner that said ridgelines are substantially parallel to one another, is provided on a light exit face corresponding to one of said major faces of said light conducting plate in such a way that projections of said straight ridgelines projected onto said light diffusion elements intersect imaginary lines which are drawn by connecting centers of most adjacent of said light diffusing elements so as to have the shortest distance between said centers, wherein said projections of said straight ridgelines form substantially an angle of 10 to 70 degrees with said imaginary lines that would be drawn on said light conducting plate.

2. The backlighting device for use with display panels according to claim 1, wherein said raised structures of said sheet is one of a dome shape, a circular shape, an elliptical shape and a sine wave shape.

3. The backlighting device for use with display panels according to claim 1, wherein said imaginary lines are intersected each other, defining a square shape.

4. The backlighting device for use with display panels according to claim 3, wherein said projections intersect said imaginary lines at an angle of 20 to 70 degrees.

5. The backlighting device for use with display panels according to claim 1, wherein said imaginary lines are intersected each other, defining a triangle shape.

6. The backlighting device for use with display panels according to claim 5, wherein said projections intersect said imaginary lines at an angle of 10 to 50 degrees.

7. The backlighting device for use with display panels according to claim 1, wherein a plurality of sheets comprising a light-transmissive material are provided in such a way that said straight ridgelines on said first sheet intersect the straight ridgelines on an adjacent sheet.

8. The backlighting device for use with display panels according to claim 1, wherein a plurality of sheets comprising a light-transmissive material are provided in such a way that said straight ridgelines on said first sheet intersect the straight ridgelines on an adjacent sheet.

9. The backlighting device for use with display panels according to claim 7, wherein a plurality of sheets comprising a transmissive material are provided in such a way that said straight ridgelines on said first sheet intersect the ridgelines on an adjacent sheet substantially at an angle of 75 to 115 degrees.

10. The backlighting device for use with display panels according to claim 8, wherein a plurality of sheets comprising a transmissive material are provided in such a way that said straight ridgelines on said first sheet intersect the ridgelines on an adjacent sheet substantially at an angle of 75 to 115 degrees.

11. The backlighting device for use with display panels according to any one of claims 1, 2, 3–8, 9, 10, wherein the sheet or sheets comprising a light-transmissive material are such that the distance between said adjacent straight ridgelines is 10 to 1,000 μm.

* * * * *